United States Patent [19]

Ritacco

[11] Patent Number: 4,742,605
[45] Date of Patent: May 10, 1988

[54] SAFETY RELEASE DEVICE

[76] Inventor: Gerald E. Ritacco, R.F.D. 13, Box 172, Loudon, N.H. 03301

[21] Appl. No.: 916,608

[22] Filed: Oct. 8, 1986

[51] Int. Cl.⁴ .................. A44B 11/25; A44B 17/00
[52] U.S. Cl. ............................... 24/602; 24/664; 114/217; 119/114
[58] Field of Search .............. 119/110, 111, 114; 114/216, 217; 24/602, 664; 54/69, 70

[56] References Cited

U.S. PATENT DOCUMENTS

| | | | |
|---|---|---|---|
| 602,569 | 4/1898 | Turner | 119/114 X |
| 3,044,813 | 7/1962 | Affeldt | 24/602 X |
| 3,413,692 | 12/1968 | Pressley | 24/602 |
| 3,540,089 | 11/1970 | Franklin | 119/110 X |
| 3,704,633 | 12/1972 | Iverson | 24/602 |

Primary Examiner—Robert P. Swiatek
Attorney, Agent, or Firm—Lee A. Strimbeck

[57] ABSTRACT

A safety release device particularly useful for tethering horses comprises a cylindrical housing, a central shaft therein having on one end a spring retainer/trigger and on the other end a capture washer held by a stop or shoulder on the shaft, a spring between the retainer and the washer, two opposed spring loaded capture dogs engaging the capture washer and preventing it and the shaft from being pulled from the housing until released and fastening members, one attached to the end of the shaft and another attached to the housing to permit lines to be attached thereto. The operation of the device is such that when a sufficient pull is exerted on the shaft, the spring compresses allowing the retainer/trigger to move toward the capture washer against the action of the spring and in so doing to force the dogs apart releasing the washer and thus the shaft.

3 Claims, 1 Drawing Sheet

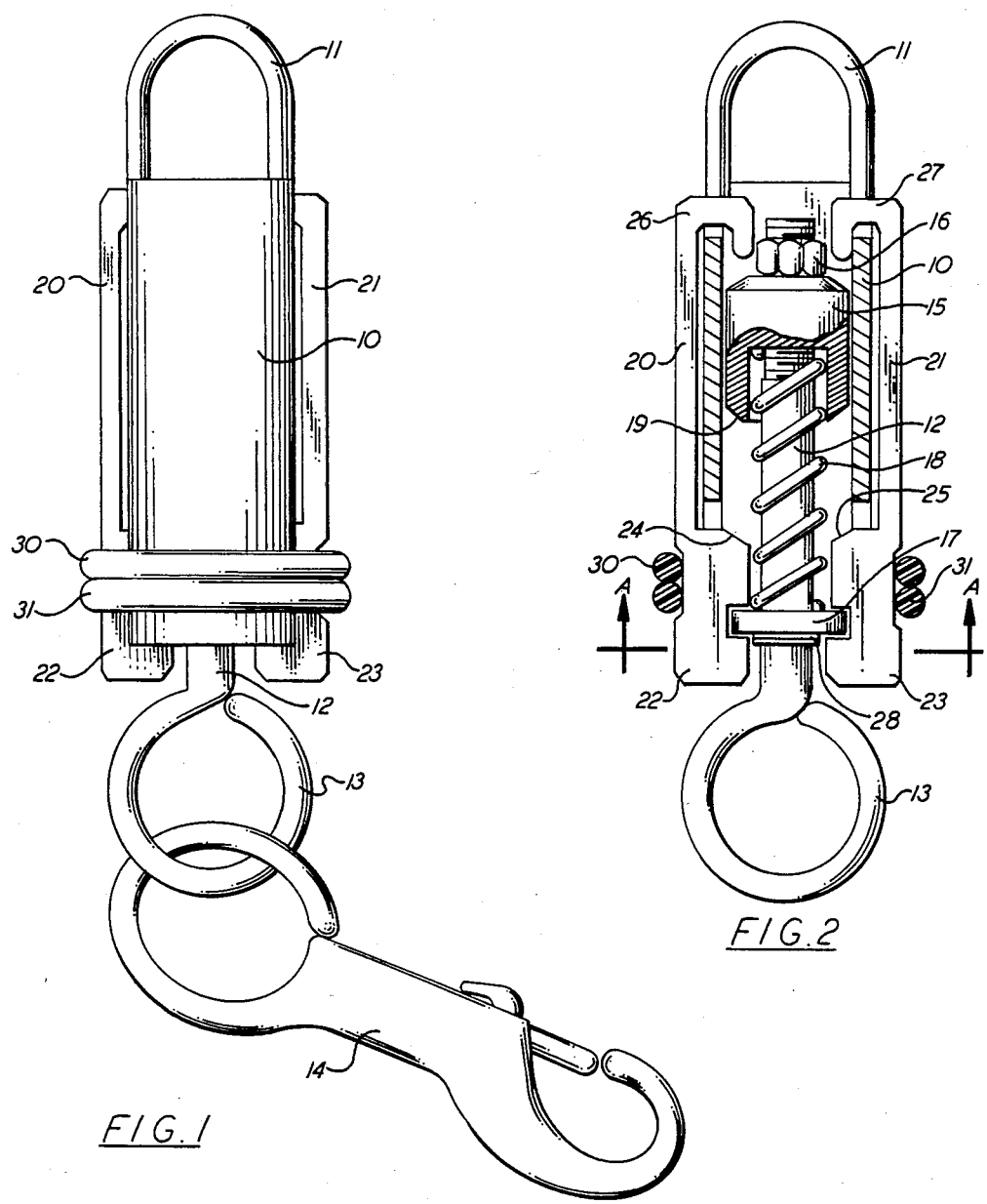
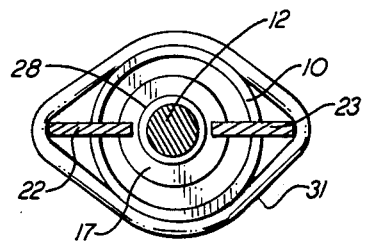

SAFETY RELEASE DEVICE

This invention is a line safety release device for break away snap to prevent the overstressing of lines, chains and the like. It is particularly useful for cross-tieing horses, providing automatic release in panic situations.

The device of this invention is designed to release at a pre-determined level of trip force, the amount of which depends upon the application. The device consists basically of two main components, a standard swivel-type snap mechanism, and an overload trip mechanism that breaks away or releases when a pre-determined draw or load is exceeded. One of the features of this invention is that the mechanism maintains its mechanical integrity after the breakaway and can be readily reassembled for reuse.

When used for cross-tieing horses, the spring loaded mechanism is set to provide a pre-determined tug on the horses halter prior to the engagement of the release mechanism. Most horses give in to this tug and the release of the mechanism is avoided. This is convenient as even an active horse is not apt to trip the release mechanism while one tends to normal cross-tieing chores, such as grooming, tacking and the like.

Should the horse panic, rear, jump forward or backward, to the side or fall while cross-tied, the device of this invention will release. With the horse's head released, the animal is not likely to snap its neck or break weaker equipment or structures to which the cross-ties are attached, as for example, yanking a terminating screw eye from a barn beam.

Experience has shown that when an animal is released at the stage of panic necessary to trip the release mechanism of this invention, most horses react dumbfoundly by standing quietly wondering, "what has happened". Once released, the mechanism can simply be reconnected for reuse.

The mechanism of this invention will find use not only for cross-tieing, but also for other stall tethering, trail tethering, rope tie-offs such as gateways and doorways, and hot walking tethering. Unlike some other type of snaps, no human intervention is needed to release the horse and unlike breakaway halters used when training young horses, the halter remains on the horse after the device of this invention has released, allowing for easier retrieval of the loose horse.

Other advantages of this invention is that it is small, less than 4½ inches in length overall, relatively lightweight and easy to use.

In brief compass, the release device of this invention comprises a cylindrical housing, a central shaft therein having on one end a spring retainer/trigger and on the other end a capture washer held by a stop or shoulder on the shaft, a compressed spring between the retainer and the washer, two opposed spring loaded capture dogs engaging the capture washer and preventing it and the attached shaft from being pulled from the housing until released and fastening means one attached to the end of the shaft and the other attached to the housing to permit lines to be attached thereto. The operation of the device is such that when a sufficient pull is exerted on the shaft, the spring compresses allowing the retainer/trigger to move toward the capture washer against the action of the spring and in so doing to force the dogs apart releasing the washer and thus the shaft.

THE DRAWINGS

In the drawings:

FIG. 1 is an elevation view of the device;

FIG. 2 is a similar view broken away to show the internal mechanism. The housing is shown broken away at about its center line. The dogs, the shaft and spring washer are not however sectioned. The retainer/trigger is in part sectioned; and FIG. 3 is a top section view of the device taken along line AA of FIG. 2.

In the figures like parts have the same number.

DESCRIPTION

Referring to the drawings, the device consists of a housing 10 which ends in an eye 11 to which a line can be fastened. Centerly disposed in the housing is a shaft 12 which ends in another eye 13 to which a line can be fastened as by means of a snap hook 14 which is not part of the invention. The shaft has attached to it at one end a retainer/trigger 15 which can move along the shaft. It is held on the shaft by a nut 16 which permits adjustment of the position of retainer 15 on the shaft, the shaft being threaded to receive the nut 16. At the other end of shaft 12 there is a fixed capture washer 17 held by shoulder 28 and between the retainer 15 and the washer 17 there is a spring 18 under compression. This spring causes the device to exert a tug or definite resistance before the release mechanism is engaged.

Two dogs 20 and 21 engage the washer 17 and prevent it and the attached shaft from exiting the housing until released. The dogs have heads 22 and 23 respectively which are notched to engage the washer. The bottom of the heads 22 and 23 facing the retainer 15 are beveled at 24 and 25 respectively to engage a correspondingly beveled surface 19 on retainer/trigger 15 when the retainer/trigger is moved by a pull on the shaft against the action of the spring to the point of engagement. Upon engagement and continued pulling, the dogs 20 and 21 are forced apart releasing washer 17. Capture washer 17 slides on shaft 12 and is retained by shoulder 28. Thus shaft 12 may be pulled through washer 17 against the action of spring 18 up to the point of engagement of the shoulders 24 and 25 with beveled surface 19.

Dogs 20 and 21 extend the length of the housing externally thereof and terminate in engagement legs 26 and 27 respectively. The housing is apertured or slotted to receive the heads and legs of the capture dogs such that the engagement legs 26 and 27 prevent the movement of the dog when there is a pull on the shaft 12. As illustrated, the legs 26 and 27 may be J-shaped to assure positive locking.

The heads of dogs 20 and 21 are restrained from movement away from the housing by means of elastomeric rings 30 and 31. Illustrated are 0 rings but items 30 and 31 could as well be rubber bands or coiled stainless steel springs.

The operation of the device is quite straightforward. When a draw or pulling force is placed on eyes 11 and 13, shaft 12 and retainer 15 move toward capture washer 17. If the tug or force is insufficient to cause contact to occur between retainer 15 and dogs 20 and 21, then no release occurs. However, if the force is sufficient, shoulder 19 of retainer/trigger 15 contacts the shoulders 24 and 25 of the dog heads 22 and 23 forcing them apart against the action of the retainers 30 and 31 until they release capture washer 17. Upon the release of washer 17, the whole of shaft 12, washer 17, spring 18, retainer 15 and nut 16 are free to exit the housing.

The amount of force necessary to cause release is of course determined by the amount of force exerted by spring 18 and the retainers 30 and 31. Spring 18 can be sized to give a sufficient tug or restraining force to hold a horse under normal circumstances if the device is used in a cross-tie. However, if sufficient force is exerted, the shoulder 19 of retainer/trigger 15 is pulled up against the beveled shoulders 24 and 25 of heads 22 and 23 and pushes them apart against the action of retainers 30 and 31. Retainers 30 and 31 therefore determine the ultimate breakaway force necessary to cause the device to release and can be sized as desired. As they are external of the housing and readily available to the user, the user by applying different size 0 rings or the like can set the amount of release force the user may desire.

If released, the device is readily reassembled by spreading heads 22 and 23 and forcing the shaft and its attached components back into the housing until washer 17 is engaged by heads 22 and 23.

What is claimed is:

1. A release device comprising, in combination:
   (a) a housing, one end of which ends in a first means for fastening;
   (b) a shaft thereon extending from the other end of said housing and endin in a second means for fastening;
   (c) a capture washer on one end of said shaft adjacent internally said other end of said housing, slidable on said shaft and presenting a retaining surface generally perpendicular to the center line of said shaft and being free to exit said housing with said shaft if not retained, said shaft having a retaining shoulder limiting movement of said capture washer on said shaft;
   (d) a spring retainer slidably mounted on the other end of said shaft internal of said housing and having a first beveled face facing said capture washing;
   (e) a spring normally under compression between said capture washer and said spring retainer;
   (f) at least one capture dog extending from said capture washer longitudinally externally of said housing, said at least one capture dog having at one end a head and at the other an engagement leg, said housing having apertures to receive said head and engagement leg, said head having a shoulder that normally engages said retaining surface and a second beveled face adapted to be engaged by said first beveled face with said head being forced outwardly thereby and releasing said capture washer, and said engagement leg extending into said housing and being adapted to pivot thereagainst, and a retaining means yieldingly holding said at least one capture dog in engagement with said capture washer;

the whole of said device being adapted when said first and second means for fastening are drawn apart to compress said spring and allow said spring retainer to move towards said capture washer and, when the drawing force reaches a pre-determined maximum, to allow said first and second beveled faces to engage, forcing said head outwardly against the action of said second retaining means and releasing said capture washer and shaft from said housing.

2. The release device of claim 1 wherein:
   (a) said housing is cylindrical;
   (b) said first and second means for fastening are adapted to be secured to lines;
   (c) said spring is a spiral spring about said shaft;
   (d) there are an opposed pair of said capture dogs; and
   (e) said retaining means being an elastomeric band about said capture dogs and housing.

3. A safety release device comprising a cylindrical housing, a central shaft therein having on one end a spring retainer/trigger and on the other end a capture washer held by a shoulder on said central shaft, a spring between said retainer/trigger and said capture washer, two opposed spring-loaded capture dogs engaging said capture washer and preventing said capture washer and said shaft from being pulled from the housing until released and fastening means one attached to the end of the shaft and another attached to the housing to permit lines to be attached thereto, in operation when a sufficient pull is exerted on said central shaft, said spring compresses allowing said spring retainer/trigger to move toward said capture washer against the action of said spring and in so doing to force said capture dogs apart releasing said capture washer and shaft.

* * * * *